(12) United States Patent
Yokogawa (10) Patent No.: US 7,711,461 B2
(45) Date of Patent: May 4, 2010

(54) FAULT DIAGNOSIS DATA RECORDING SYSTEM AND METHOD

(75) Inventor: Nobuhiro Yokogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 11/793,334

(22) PCT Filed: Jan. 12, 2006

(86) PCT No.: PCT/JP2006/000683

§ 371 (c)(1),
(2), (4) Date: Jun. 19, 2007

(87) PCT Pub. No.: WO2006/077900

PCT Pub. Date: Jul. 27, 2006

(65) Prior Publication Data

US 2008/0208533 A1    Aug. 28, 2008

(30) Foreign Application Priority Data

Jan. 19, 2005    (JP)    ............................. 2005-011573

(51) Int. Cl.
*G01M 17/00*    (2006.01)
(52) U.S. Cl. ......................................... 701/33; 701/35
(58) Field of Classification Search ........................ None
See application file for complete search history.

(56) References Cited

U.S. PATENT DOCUMENTS

| | | | | |
|---|---|---|---|---|
| 5,481,906 A | * | 1/1996 | Nagayoshi et al. ....... | 73/114.61 |
| 5,555,171 A | * | 9/1996 | Sonehara et al. .............. | 701/33 |
| 6,012,004 A | * | 1/2000 | Sugano et al. ................ | 701/33 |
| 6,285,931 B1 | | 9/2001 | Hattori et al. | |
| 6,330,499 B1 | | 12/2001 | Chou et al. | |
| 6,430,164 B1 | | 8/2002 | Jones et al. | |
| 6,978,198 B2 | * | 12/2005 | Shi ............................. | 701/33 |
| 2002/0029359 A1 | | 3/2002 | Kiyoi et al. | |

FOREIGN PATENT DOCUMENTS

| | | |
|---|---|---|
| EP | 1 345 182 A2 | 9/2003 |
| JP | A-62-219843 | 9/1987 |
| JP | A-7-334382 | 12/1995 |
| JP | B2 2601 194 | 1/1997 |
| JP | A 10-276198 | 10/1998 |
| JP | A 2000-066959 | 3/2000 |
| JP | A 2002-245022 | 8/2002 |
| JP | A-2004-302944 | 10/2004 |

* cited by examiner

*Primary Examiner*—Chi H Pham
*Assistant Examiner*—Kouroush Mohebbi
(74) *Attorney, Agent, or Firm*—Oliff & Berridge, PLC (57) ABSTRACT

In a fault diagnosis data recording system including a plurality of nodes interconnected by a multiplex communication line, a first node is provided to perform fault detection of the first node, and a second node connected to the first node via the multiplex communication line is provided to have a storage unit. The first node and the second node are configured to store at least a part of result data of the fault detection performed by the first node, into the storage unit of the second node.

12 Claims, 5 Drawing Sheets

FAULT DIAGNOSIS DATA RECORDING SYSTEM AND METHOD

TECHNICAL FIELD

The present invention generally relates to a fault diagnosis data recording system and method, and more particularly to a fault diagnosis data recording system and a fault diagnosis data recording method which are appropriate for use in storing at least a part of result data of a fault detection performed by one node into a storage unit among a plurality of nodes interconnected by a communication line.

BACKGROUND ART

Conventionally, there is known a system which is provided with a plurality of control units which control an engine and an automatic gear shift in an automotive vehicle and each of the plurality of control units performs fault detection by itself, respectively. For example, see Japanese Patent No. 2601194.

In the system of Japanese Patent No. 2601194, a control unit having a data communication capability among the plurality of control units is used to transmit data, indicated by the result of the fault detection performed by each control unit, to an external device outside the system.

Moreover, there is also known a system which is provided with a plurality of nodes, and each of the plurality of nodes is provided with a memory which stores data respectively. For example, see Japanese Laid-Open Patent Application No. 10-276198.

A conceivable method for storing the diagnosis data, created by the fault detection performed by the control unit (node) is that each of the plurality of control units is provided with a memory respectively, and the diagnostic data created by one control unit is always stored in its memory of the control unit (self-node storage).

However, with the composition in which the diagnostic data created by one control unit is always stored in its memory of the control unit (self-node storage), the situation where the created diagnostic data cannot be stored in its memory because of lack of the storage capacity of the memory of the control unit concerned or the situation where the previously stored data in the memory of the control unit must be erased in order to store the created diagnostic data may arise.

A conceivable method for avoiding such situations (insufficient storage capacity of the memory) is to provide a memory having a large storage capacity for each of the plurality of control units. However, if such method is used, another problem of the increase in the cost and the loading space will arise.

DISCLOSURE OF THE INVENTION

An object of the present invention is to provide an improved fault diagnosis data recording system and method in which the above-mentioned problems are eliminated.

Another object of the present invention is to provide a fault diagnosis data recording system and method in which a request for storage of diagnosis data created by a fault detection is transferring from one node to another among a plurality of nodes interconnected by a multiplex communication line, and the above-mentioned problems are eliminated.

In order to achieve the above-mentioned objects, the present invention provides a fault diagnosis data recording system including a plurality of nodes interconnected by a multiplex communication line, the fault diagnosis data recording comprising: a first node which performs fault detection of the first node; and a second node connected to the first node via the multiplex communication line and having a storage unit, wherein the first node and the second node are configured to store at least a part of result data of the fault detection performed by the first node, into the storage unit of the second node.

In order to achieve the above-mentioned objects, the present invention provides a fault diagnosis data recording method which records diagnosis data in a plurality of nodes interconnected by a multiplex communication line, the fault diagnosis data recording method comprising the steps of: providing a first node which performs fault detection of the first node; providing a second node connected to the first node via the multiplex communication line and having a storage unit; and storing at least a part of result data of the fault detection performed by the first node, into the storage unit of the second node.

In the above-mentioned data recording system and method of the invention, at least a part of the result data of the fault detection performed by the first node is stored into the storage unit of the second node. For this reason, even when the first node cannot store the diagnosis data created by the fault detection, the diagnosis data can be stored by the second node different from the first node. And, even if the first node has a storage unit with a low storage capacity, it is possible to acquire safely and reliably the stored diagnosis data created by the fault detection performed by the first node.

In this case, the above-mentioned fault diagnosis data recording system may be configured so that identification information of the first node is associated with the result data of the fault detection performed by the first node, and the identification information is further stored in the storage unit.

Moreover, in order to achieve the above-mentioned objects, the present invention provides a fault diagnosis data recording system comprising: a plurality of nodes interconnected by a multiplex communication line; each node performing a fault detection of the node; and each node configured to store at least a part of result data of the fault detection performed by the self node, into a storage unit of one of the plurality of nodes other than the self node.

In order to achieve the above-mentioned objects, the present invention provides a fault diagnosis data recording method comprising the steps of: providing a plurality of nodes interconnected by a multiplex communication line; performing, at each of the plurality of nodes, a fault detection of the self node; and storing, at each of the plurality of nodes, at least a part of result data of the fault detection performed by the self node, into a storage unit of one of the plurality of nodes other than the self node.

In the above-mentioned fault diagnosis data recording system and method of the invention, each node in the plurality of nodes interconnected by the multiplex communication line is configured to store at least the part of the result data of the fault detection performed by the self node, into the storage unit of one of the plurality of nodes other than the self node. For this reason, even when a certain node among the plurality of nodes cannot store the diagnosis data created by the fault detection, the diagnosis data can be stored by another node among the plurality of nodes different from that node. And, even if that node has a storage unit with a low storage capacity, it is possible to acquire safely and reliably the stored diagnosis data created by the fault detection performed by that node.

In this case, the above-mentioned fault diagnosis data recording system of the invention may be configured so that identification information of the self node is associated with the result data of the fault detection performed by the self node, and the identification information is further stored in the storage unit.

The above-mentioned fault diagnosis data recording system of the invention may be configured so that the one of the plurality of nodes other than the self node is set up beforehand in correspondence with the self node.

The above-mentioned fault diagnosis data recording system of the invention may be configured so that the self node is configured to transmit the result data from the self node to the one of the plurality of nodes through the multiplex communication line, and the one of the plurality of nodes other than the self node is configured to receive the result data through the multiplex communication line and store the received result data into the storage unit.

The above-mentioned fault diagnosis data recording system of the invention may be configured so that the self node is configured to transmit the result data from the self node to two or more other nodes of the plurality of nodes through the multiplex communication line, and wherein each of the other nodes of the plurality of nodes is configured to receive the result data through the multiplex communication line and temporarily store the received result data into a storage unit of that node, respectively, and wherein each of the other nodes is configured to perform, after the temporary storage, arbitration of the temporarily stored result data according to a predetermined rule, so that one of the other nodes which is chosen by the arbitration finally stores the temporarily stored result data in the storage unit.

The above-mentioned fault diagnosis data recording system of the invention may be configured so that the remaining nodes of the other nodes which are not chosen by the arbitration are configured to erase the result data temporarily stored in the storage unit respectively.

The above-mentioned fault diagnosis data recording system of the invention may be configured so that each of the plurality of nodes is configured to receive a request from an external diagnostic device connected to the multiplex communication line, and transmit to the external diagnostic device the result data stored in a storage unit of that node, in response to the received request.

According to the present invention, a request for storage of diagnosis data created by a fault detection performed by one node is transferred from the node to another node among the plurality of nodes interconnected by the multiplex communication line, and it is possible to safely and reliably acquire the stored diagnosis data even when the diagnosis data is created by the fault detection performed by a node having a storage unit with a low storage capacity.

BRIEF DESCRIPTION OF THE DRAWINGS

Other objects, features and advantages of the present invention will be apparent from the following detailed description when reading in conjunction with the created by drawings.

BEST MODE FOR CARRYING OUT THE INVENTION

A description will now be given of an embodiment of the invention with reference to the created by drawings.

Figure 1:
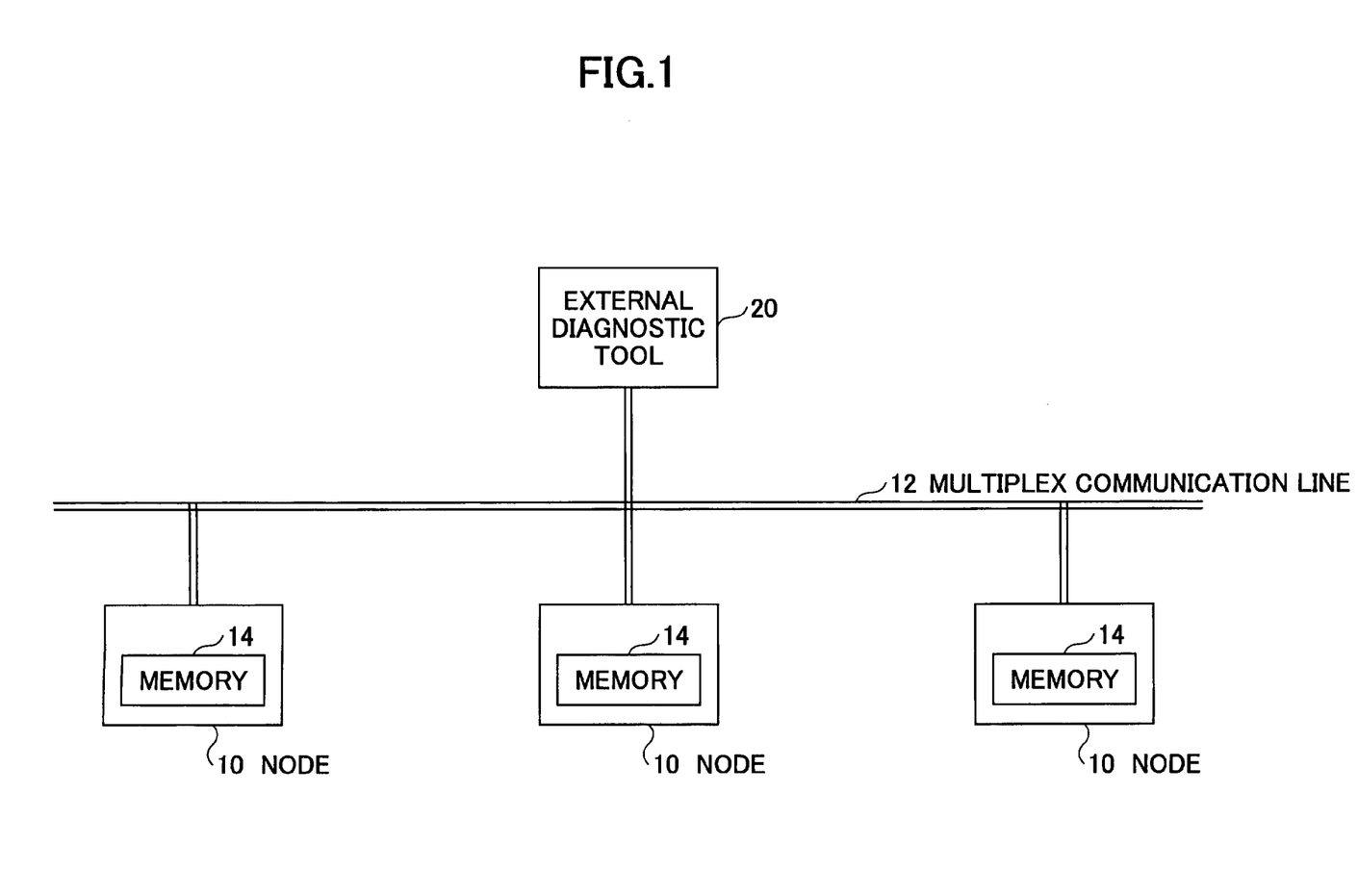
FIG. 1 is a block diagram showing the composition of a fault diagnosis data recording system in an embodiment of the invention.

FIG. 1 shows the composition of a fault diagnosis data recording system in an embodiment of the invention, which is installed in an automotive vehicle. The fault diagnosis data recording system of this embodiment comprises a plurality of nodes 10 (which are in this embodiment three nodes) and a multiplex communication line 12 which interconnects the plurality of nodes 10.

The multiplex communication line 12 is a shared bus which is composed of a single wire line or twisted pair wire, such as that used in CAN (Controller Area Network). The multiplex communication line 12 makes it possible to transmit the data sent from each node 10 by a time-division multiplex scheme according to a predetermined communication protocol (multiplex transmission).

Namely, each node 10 can start the transmission of data from the self node to the multiplex communication line 12 when other data is not transmitted to the multiplex communication line 12. When data transmission is simultaneously started by one or more other nodes 10, the data transmission is performed according to the transmission priority of each node. When data transmission from other nodes 10 is being performed, the node 10 of concern is set in a waiting state for a fixed period of time and thereafter the data transmission is performed.

The data sent from each node 10 is transmitted to other nodes 10 or an external diagnostic tool 20 (which will be described below) via the multiplex communication line 12.

Each node 10 is constituted by an ECU which is an electronic control unit provided in one of various control units of the vehicle, or an intelligent sensor provided in the vehicle.

For example, each node 10 may be constituted by any of a steering angle sensor which outputs a signal indicative of the steering angle, a yaw rate sensor which outputs a signal indicative of the yaw rate created around the central axis of the center of gravity of the vehicle. Or each node 10 may be constituted by any of an engine ECU which performs engine control based on the throttle opening ratio, the accelerator opening ratio, the engine water temperature, etc., a VSC (vehicle stability control) ECU which is provided to stabilize the cornering action of the vehicle based on the wheel speed, the yaw rate, the steering angle, etc., a transmission ECU which controls the shift position of the vehicle based on the shift operation position, etc., a brake ECU which controls the braking force of the vehicle based on the brake treading force, the steering angle, etc., a power-steering ECU which controls steering assistant power based on the steering angle, etc., and an automatic air-conditioner ECU which controls air conditioning in the vehicle based on the air-conditioner operation switch, the in-vehicle temperature, etc.

Each node 10 comprises a microcomputer having a controller, and a communication module linked to the microcomputer, respectively. The microcomputer controls the controller according to the common communications protocol in the network which is composed of the multiplex communication line 12 and the plurality of nodes 10, so that the output data being outputted from the self node 10 are digitized for transmission to another node 10 via the multiplex communication line 12, and the input data being received from another node 10 via the multiplex communication line 12 are decoded for the use for control of the self node. The communication module is controlled by the controller, so that the communication module transmits the data converted by the microcomputer to the multiplex communication line 12 in order to transmit the data of the self node 10 to another node 10, and receives the data transmitted from another node 10 to the self node 10.

Each node 10 performs control of the self node based on the states of the sensors or switches linked to the self node 10 and further based on the data transmitted from other nodes 10, respectively.

The data which are transmitted by each node 10 to the multiplex communication line 12 are constituted by a predetermined data frame. This data frame is, for example, composed of the start-of-frame (SOF) which indicates the beginning of the data being transmitted, the frame ID which indicates the identification information (also indicates the priority of data transmission) for identifying the kind of the data being transmitted and distinguishing from other kinds of data, the data length code (DLC) which indicates the length of the data being transmitted, and the data field which indicates the contents of the data being transmitted (e.g., the information on the wheel speed, the control command value of the driving torque, etc.), the CRC field for checking a transmission error, the field for checking that reception of the data has been completed normally, and the end-of-frame (EOF) which indicates the end of the data being transmitted.

Moreover, each node 10 has a function of detecting whether a certain fault arises in the self node 10, such as occurrence of abnormal data which cannot happen in the normal state, respectively. Moreover, each node 10 has a function of detecting the date/time of occurrence of the fault, the control data used for control of the self node, and the vehicle state data which indicate the state of the vehicle operation (for example, engine speed (rpm), various temperature data, vehicle speed, vehicle position, shift position, and accelerator opening ratio, which will be collectively called the diagnosis data).

Each node 10 has a non-volatile memory 14, respectively. The contents of detection at the time of fault being detected are stored in the memory 14 as the fault diagnostic code, and the diagnosis data of the control data or the vehicle state data at the time of detection of the fault are also stored in the memory 14.

What is necessary for this embodiment is just to provide a memory 14 for each node 10 which has a storage capacity corresponding to the self node 10, respectively. Namely, the node 10 which deals with a comparatively small amount of data has a memory 14 with a small storage capacity, and the node 10 which deals with a comparatively large amount of data has a memory 14 with a large storage capacity.

In the multiplex communication line 12, the connector to which the external diagnostic tool 20 can be connected is disposed in the vehicle at the position where the attachment and detachment work can be easily performed. The external diagnostic tool 20 is connected to the multiplex communication line 12 via the connector, and the external diagnostic tool 20 is further connected to each node 10 via the multiplex communication line 12.

The external diagnostic tool 20 is a device which is connected to the multiplex communication line 14 when a fault occurring in each node 10 should be diagnosed, performs transmission and reception of data with each node 10 in the connected state, and carries out the fault diagnosis of that node 10.

Next, the step of storing the diagnosis data related to the fault or the contents of detection of the fault detected by each node 10, and the step of reading the stored diagnosis data in the fault diagnosis data recording system of this embodiment will be explained.

Figure 2A:
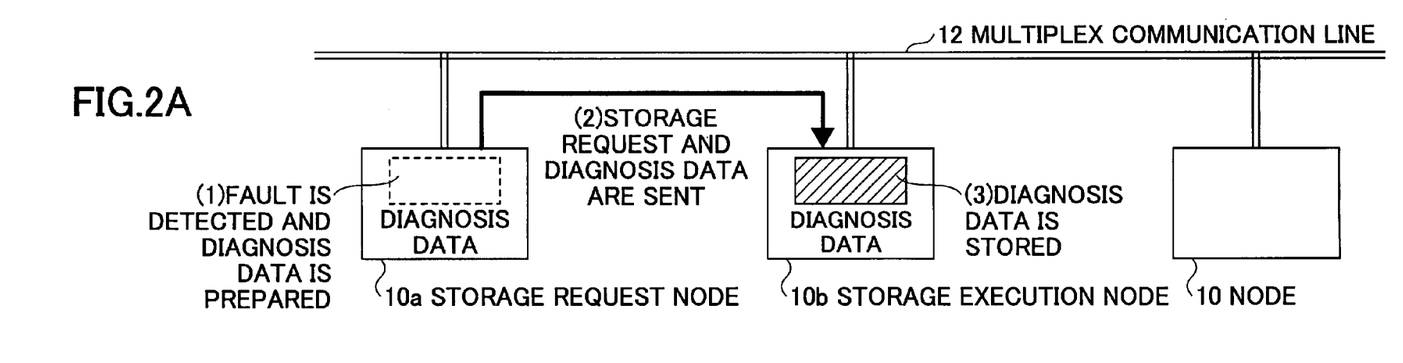
FIG. 2A and FIG. 2B are diagrams for explaining the step of storing diagnosis data, created by fault detection performed by a node, into another node, and the step of reading the stored diagnosis data from the other node, which steps are performed by the fault diagnosis data recording system of this embodiment.
Figure 2B:
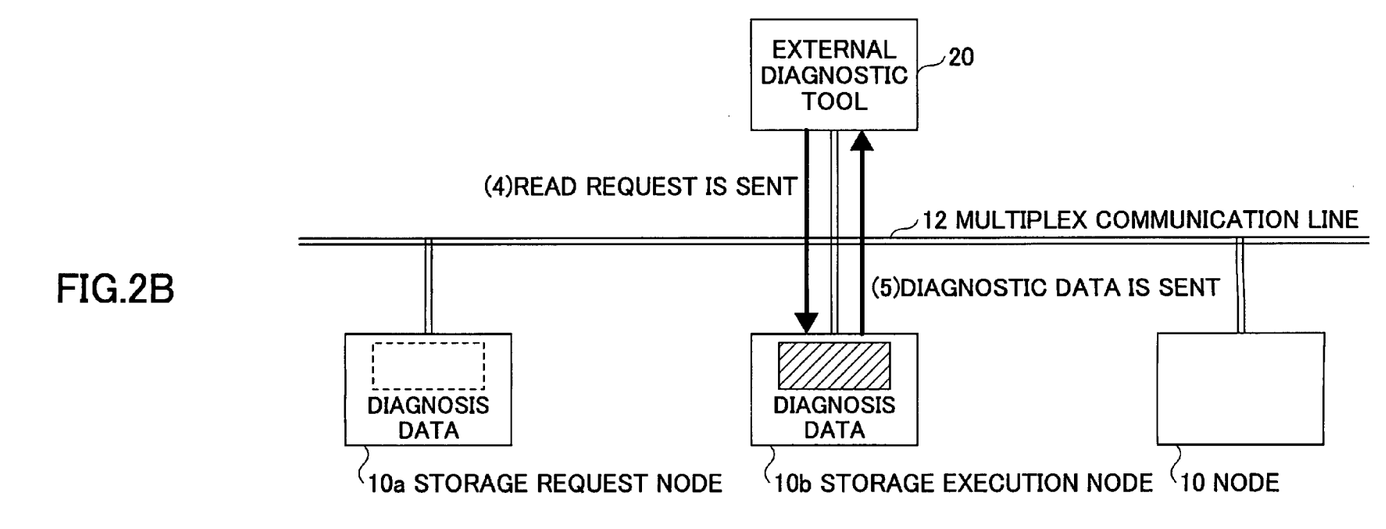
Figure 3:
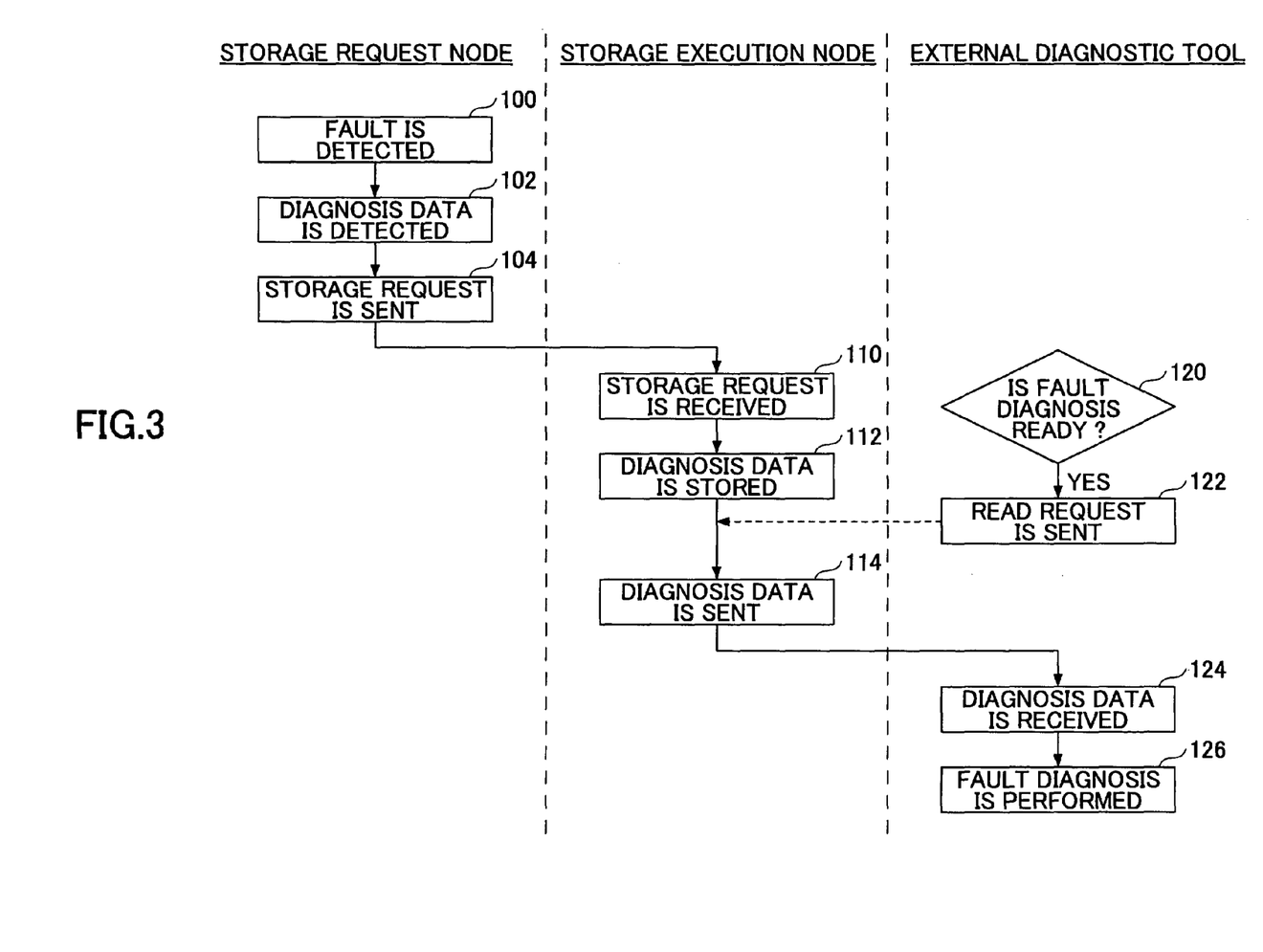
FIG. 3 is a flowchart for explaining the control procedure of a fault diagnosis data recording method which is performed by the fault diagnosis data recording system of this embodiment.

FIG. 2A shows the step of storing the diagnosis data in the system of this embodiment, and FIG. 2B shows the step of reading the stored diagnosis data, in the system of this embodiment, respectively. FIG. 3 is a flowchart for explaining the control procedure of the fault diagnosis data recording method performed by the system of this embodiment.

(1) Fault Detection and Preparation of Diagnosis Data

As described above, in the fault diagnosis data recording system of this embodiment, each node 10 can detect a fault in the self node, respectively.

Suppose that the node 10 detects the fault of the self node (step 100 shown in FIG. 3). Then, the node 10 detects and prepares the diagnosis data including the control data and the vehicle state data at the time of the detection time together with the contents of the detected fault (step 102).

At this time, the prepared diagnosis data is temporarily stored in the volatile memory (not shown) of this node 10 and continuously retained in the volatile memory until a request for storage of the diagnosis data is sent to another node 10.

Among the nodes 10 which detect the fault of the self node, there is at least one node 10 which transfers a request for storing the diagnosis data containing the control data detected by the self node, into the memory 14 of another node 10, to another node 10 other than the self node 10. In the following, the node 10 which detects the fault of the self node and requests the storage of the diagnosis data to another node 10 is referred to as storage request node 10a, and the node 10 which receives the request of the storage of the diagnosis data from another node 10 and performs the storage of the diagnosis data into the memory 14 of the self node 10 is referred to as storage execution node 10b, respectively.

It is preferred that the node 10 having the memory 14 with a comparatively small storage capacity is set to the storage request node 10a, and the node 10 having the memory 14 with a comparatively large storage capacity is set to the storage execution node 10b.

In this embodiment, for every storage request node 10a, one storage execution node 10b which should receive the request of storage the diagnosis data from the storage request node 10a is predetermined, and the node 10 stores beforehand the identification information of the storage execution node 10b to which the request for storage of the diagnosis data is transmitted when the node 10 becomes the storage request node 10a.

Alternatively, it is possible that, for a plurality of different storage request nodes 10a, the same node 10 is predetermined as the storage execution node 10b, respectively.

(2) Transfer of Storage Request and Diagnosis Data

The storage request node 10a transmits a predetermined data frame to the multiplex communication line 12 so that the node 10a requests the storage execution node 10b corresponding to the self node to store the diagnosis data of the node 10a, if the diagnosis data at the time of detection of the fault of the self node is detected (step 104). This data frame contains at least the header which indicates the identification information of the storage execution node 10b which is the data receiver, the diagnosis data being detected, and the identification information of the storage request node 10a which is the data sender.

(3) Storage Execution

The data frame sent to the multiplex communication line 12 from the storage request node 10a is received by the storage execution node 10b. And this data frame is not received by the nodes 10 which are different from the storage execution node 10b.

The storage execution node 10b receives the data frame, if the data frame which specifies the self node flows into the multiplex communication line 12 (step 110).

If the data frame sent from the storage request node 10a which is a different node 10 is received at the storage execution node 10b and a sufficient storage capacity remains in the memory 14 of the storage execution node 10b, the storage execution node 10b associates the diagnosis data contained in the data frame with the identification information of the storage request node 10a of the data sender, and stores the same in the memory 14 thereof (step 112).

(4) Read Request

When the fault is detected by the storage request node 10a and the diagnosis data created by the fault detection is stored in the memory 14 of the storage execution node 10b, the vehicle owner recognizes that a certain fault has arisen on the vehicle and grasps that the fault diagnosis should be performed to remove the fault from the vehicle. And the vehicle owner who has grasped the situation or workers of a repair factory to which the repair of the vehicle is requested by the vehicle owner, will establish the connection of the external diagnostic tool 20 and the multiplex communication line 12 through the connector.

The external diagnostic tool 20 is provided beforehand with a map which defines for every storage request node 10a the relation of the storage execution node 10b which should store the diagnosis data of the storage request node 10a. If a ready state of the external diagnostic tool 20 where the fault diagnosis can be started arises by a predetermined operation with the external diagnostic tool 20 being connected to the multiplex communication line 12 (YES of step 120), the external diagnostic tool 20 transmits to the multiplex communication line 12 the data frame which requests the storage execution node 10b, corresponding to that storage request node 10a, to perform data transmission in order to read the diagnosis data of the storage request node 10a (step 122).

This data frame may be in conformity with the original protocol defined by the international standard ISO15765, or may be in conformity with the specifically defined protocol. This data frame contains at least the identification information of the storage execution node 10b which is the request receiver, and the identification information of the storage request node 10a which has detected the diagnosis data.

(5) Data Transmission

The data frame sent to the multiplex communication line 12 from the external diagnostic tool 20 is received by the storage execution node 10b specified in the data frame. The storage execution node 10b receives the data frame, if the data frame which specifies the self node flows into the multiplex communication line 12.

If the data frame which requests the transmission of the diagnosis data of the specified storage request node 10a is received from the external diagnostic tool 20, the storage execution node 10b transmits the frame data of the diagnosis data of the specified storage request node 10a, stored in the memory 14 of the self node, to the external diagnostic tool 20 through the multiplex communication line 12 (step 114). This data frame may be in conformity with the original protocol defined by the international standard ISO15765, or may be in conformity with the specifically defined protocol.

The external diagnostic tool 20 receives the diagnosis data of the storage request node 10a which is transmitted from the storage execution node 10b by a predetermined operation (step 124). And the external diagnostic tool 20 stores the received diagnosis data in its memory, and performs the fault diagnosis of the vehicle based on the diagnosis data, so that a part of the vehicle where the fault arises is specified (step 126).

Workers of the vehicle repair factory or the vehicle owner can grasp the faulty part of the vehicle through the external diagnostic tool 20 which performs the fault diagnosis.

In the fault diagnosis data recording system of this embodiment, when a fault arises in a certain node 10, it is possible to store the diagnosis data related to the fault into the memory 14 of another node 10 which is predetermined for that node, instead of the memory 14 of that node 10. In other words, a request for storage of the diagnosis data related to the fault can be transferred from the node 10 to another node 10 through the multiplex communication line 12.

For this reason, if a fault arises in the node 10 which has the memory 14 with a comparatively small storage capacity and the memory 14 of that node 10 does not have a sufficient storage capacity to store all the diagnosis data related to the fault, the diagnosis data can be safely stored in the memory 14 of another node 10. And, at the time of subsequent fault diagnosis, the stored diagnosis data can be read from the memory 14 of another node 10 certainly. Therefore, according to the system of this embodiment, it is possible to safely and reliably acquire the stored diagnosis data even when the diagnosis data is created by the fault detection performed by a node having a storage unit with a low storage capacity, without increasing the memory space of the node.

In the above-mentioned embodiment, a single storage execution node 10b which should request the storage of diagnosis data created by detection of the fault of the self node is predetermined for every storage request node 10a, and the storage execution node 10b which receives the request for the storage of the diagnosis data from the storage request node 10a does perform the storage of the diagnosis data in the memory of the self node.

Figure 4A:
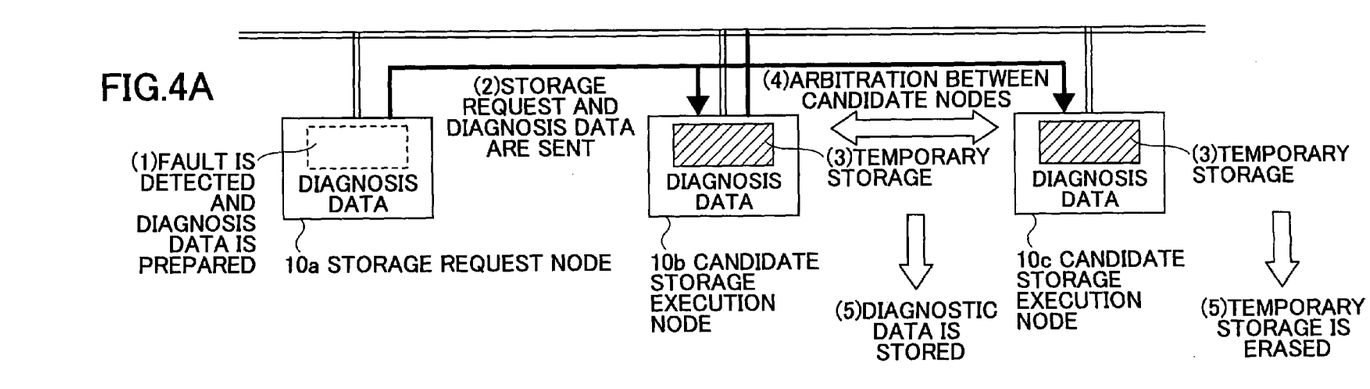
FIG. 4A and FIG. 4B are diagrams for explaining the step of storing diagnosis data, created by fault detection performed by a node, into another node, and the step of reading the stored diagnosis data from the other node, which steps are performed by the fault diagnosis data recording system in another embodiment of the invention.

On the other hand, in the following embodiment of the invention, predetermination of a single storage execution node 10b for every storage request node 10a is not used. Rather, all the nodes 10 other than the storage request node 10a on the multiplex communication line 12, each of which has the memory 14 in which diagnosis data can be stored, are considered as candidate storage execution nodes 10c to which the storage of diagnosis data is requested. After the request for the storage is received, arbitration of storage between the candidate storage execution nodes 10c is carried out in order to determine one of the candidate storage execution nodes 10c which finally stores the diagnosis data into the memory 14 of that node.

Next, the fault diagnosis data recording system of the present embodiment which performs the step of storing diagnosis data, created by a fault detection performed by a node 10, into another node 10, and the step of reading the stored diagnosis data from the other node 10 will be explained.

Figure 4B:
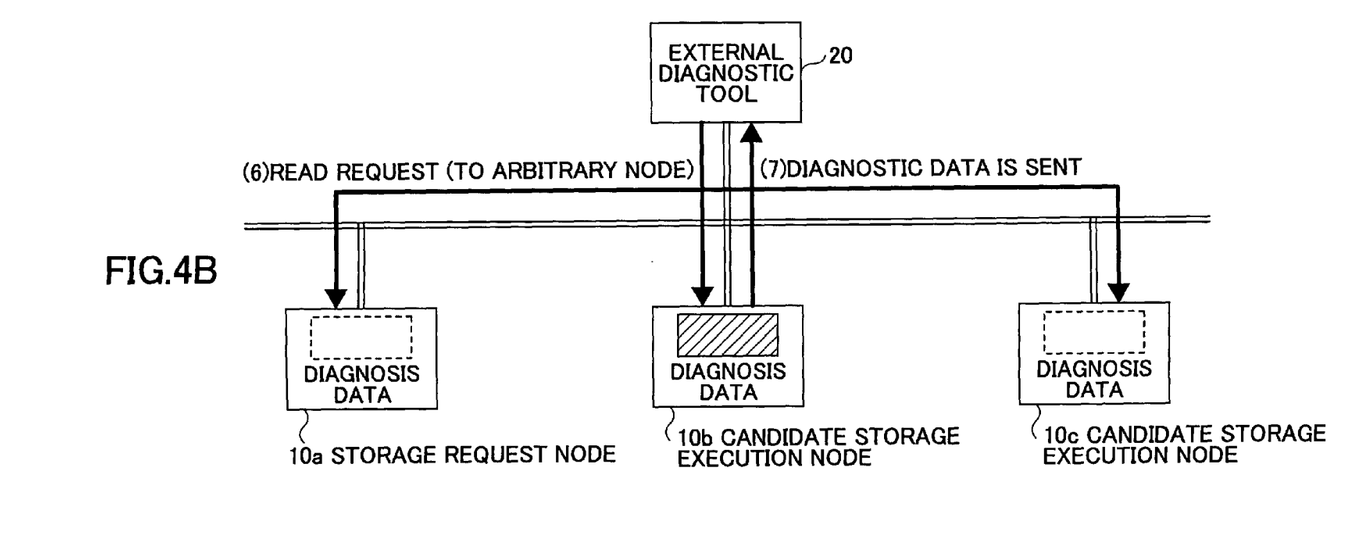

FIG. 4A shows the step of storing diagnosis data, created by a fault detection performed by the node 10, into the other node 10, and FIG. 4B shows the step of reading the stored diagnosis data from the other node 10, which steps are performed by the fault diagnosis data recording system of this embodiment. In FIG. 4A and FIG. 4B, the elements which are essentially the same as corresponding elements in FIG. 2A and FIG. 2B are designated by the same reference numerals, and a description thereof will be omitted.

Figure 5:
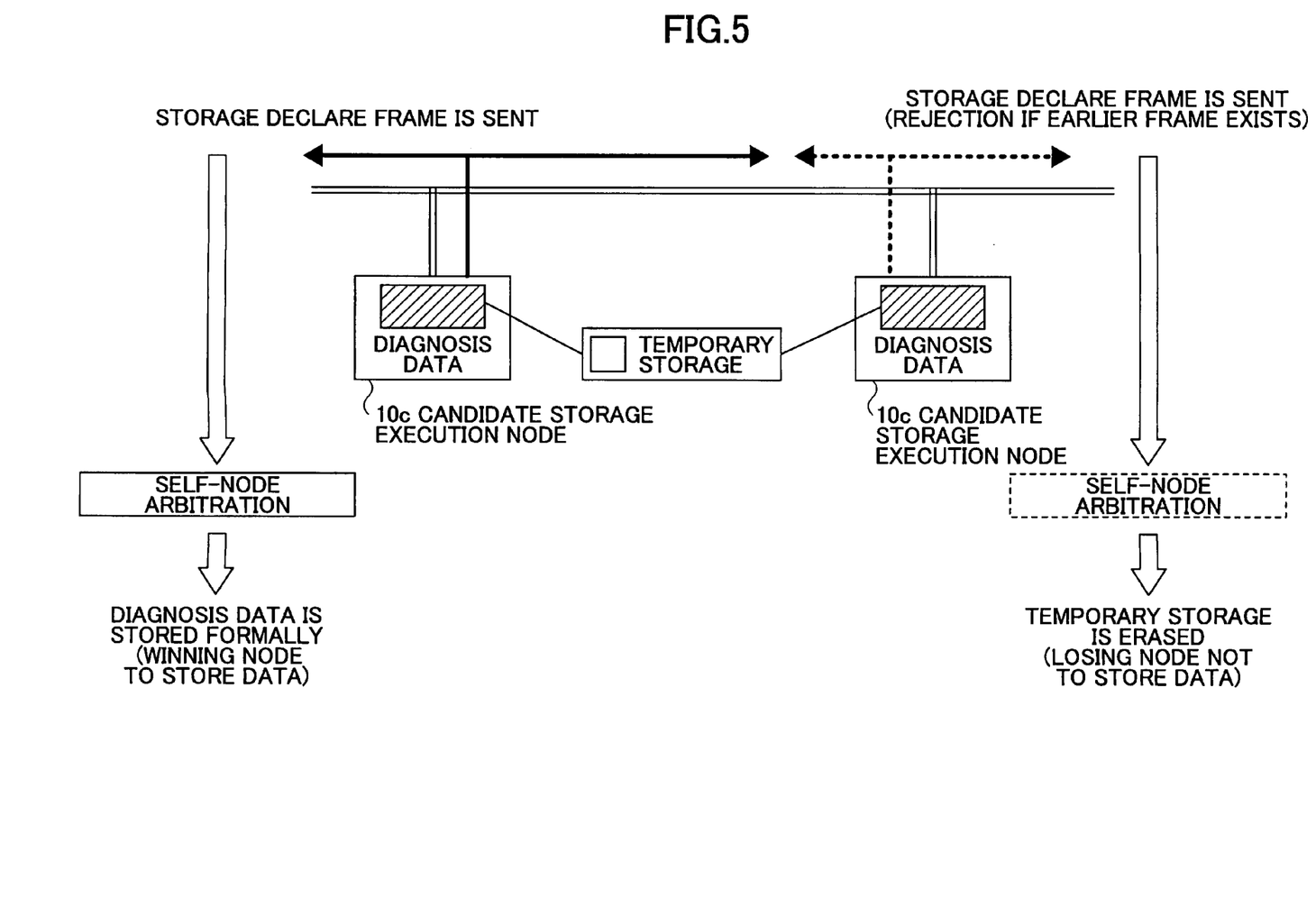
FIG. 5 is a diagram for explaining the step of performing arbitration when performing data storing between candidate storage execution nodes in the fault diagnosis data recording system of this embodiment.

FIG. 5 shows the step of performing the arbitration of storage between candidate storage execution nodes 10c which is performed by the fault diagnosis data recording system of this embodiment.

(1) Fault Detection and Preparation of Diagnosis Data

As described above, in the fault diagnosis data recording system of this embodiment, each node 10 can detect a fault of the self node, respectively. Suppose that the node 10 detects the fault of the self node. Then, the node 10 detects and prepares the diagnosis data including the control data and the vehicle state data at the time of the detection together with the contents of the detected fault.

At this time, the prepared diagnosis data is temporarily stored in the volatile memory (not shown) of the node 10 and continuously retained in the volatile memory until a request for storage of the diagnosis data is sent to another node 10.

Among the nodes 10 which detect the fault of the self node, there is at least one storage request node 10a which transfers a request for storing the diagnosis data containing the control data detected by the self node, into the memory 14 of another node 10 different from the self node 10, to the different node 10. However, in the system of this embodiment, a storage execution node is not predetermined for every storage request node 10a, unlike the system of the above-mentioned embodiment.

(2) Transfer of Storage Request and Diagnosis Data

When the diagnosis data is detected at the time of detection of the fault of the self node, the storage request node 10a transmits a predetermined data frame to the multiplex communication line 12 so that the node 10a requests the candidate storage execution nodes 10c on the multiplex communication line 12 to store the diagnosis data. This data frame contains at least the header which indicates an arbitrary data receiver node, the diagnosis data being detected, and the identification information of the storage request node 10a which is the data sender.

(3) Temporary Storage

The data frame sent to the multiplex communication line 12 from the storage request node 10a is received by all the nodes, other than the storage request node 10a, on the multiplex communication line 12 (the candidate storage execution nodes 10c).

Each of the candidate storage execution nodes 10c receives the data frame respectively, if the above-mentioned data frame flows into the multiplex communication line 12. Each of the candidate storage execution nodes 10c respectively performs, upon reception of the data frame from the storage request node 10a, the processing (temporary storage processing) in which the diagnosis data contained in the data frame is associated with the identification information of the storage request node 10a of the data sender, and temporarily stored into the memory 14 of the self node.

(4) Arbitration of Storage between Candidate Storage Execution Nodes

The candidate storage execution nodes 10c which perform the temporary storage processing for the diagnosis data received from the storage request node 10a carry out the arbitration of storage therebetween in order to determine one of the nodes 10c which finally stores the diagnosis data therein. Specifically, each of the candidate storage execution nodes 10c has a function (storage declaration frame outputting function) which transmits, when the temporary storage of the diagnosis data from the storage request node 10a to the memory 14 is actually completed, a predetermined data frame (which is called storage declaration frame) which indicates that the self node 10 has completed the temporary storage, to the multiplex communication line 12.

When the memory 14 has a sufficient storage capacity to store the diagnosis data completely, the temporary storage is completed. However, when the memory 14 has not a sufficient storage capacity to store the diagnosis data completely, the temporary storage is not completed. Moreover, each of the nodes 10 on the multiplex communication line 12 has a function which monitors the storage declaration frame which flows into the multiplex communication line 12. This function is to distinguish whether the self node 10 or another node 10 has transmitted the storage declaration frame to the multiplex communication line 12 completely.

In the case where the self node 10 is one of the candidate storage execution nodes 10c, the node 10 outputs, when any storage declaration frame is not flowing into the multiplex communication line 12 and the node 10 has completed the temporary storage of the diagnosis data received from the storage request node 10a, a storage declaration frame to the multiplex communication line 12.

On the other hand, when the self node 10 receives the storage declaration frame which has flowed into the multiplex communication line 12, the node 10 inhibits outputting of a storage declaration frame to the multiplex communication line 12, even if the self node 10 has completed the temporary storage of the diagnosis data received from the storage request node 10a. According to this arbitration method, among all the candidate storage execution nodes 10c that receive the data frame from the storage request node 10a, the node where the temporary storage of the diagnosis data is completed and the storage declaration frame is outputted to the multiplex communication line 12 for the first time is chosen as the node (winning node) which stores the diagnosis data finally.

When a plurality of candidate storage execution nodes 10c output storage declaration frames simultaneously, a winning node is selected according to the arbitration rule conforming to the communications protocol of the multiplex communication line 1 used for the system of this embodiment. For example, the smaller one of the identification number of the node 10 of the data sender contained in the data frame is preferentially chosen as a winning node.

(5) Storage Execution and Stored Data Erasing

The only candidate storage execution node 10c which has outputted the storage declaration frame and is chosen as the winning node associates the temporarily stored diagnosis data with the identification information of the storage request node 10a and finally stores the same into the memory 14.

On the other hand, the nodes 10c (losing nodes) which cannot output storage declaration frames and are not chosen as a winning node from among the candidate storage execution nodes 10c erase both the temporarily stored diagnosis data and the identification information of the storage request node 10a of the data sender in the memory 14.

(6) Read Request

When the fault is detected by the storage request node 10a and the diagnosis data are stored into the memory 14 of any of the candidate storage execution nodes 10c, the vehicle owner recognizes that a certain fault has arisen in the vehicle and grasps that the fault diagnosis should be performed to remove the fault from the vehicle.

And the vehicle owner who has grasped the situation or workers of a repair factory to which the repair of the vehicle is requested by the vehicle owner will establish the connection of the external diagnostic tool 20 and the multiplex communication line 12 through the connector.

The external diagnostic tool 20 is not provided with a map which defines the relation of the storage request node 10a and the storage execution node 10b as in the above-mentioned embodiment. When the situation where the fault diagnosis should be performed by a predetermined operation in the state where it connected with the multiplex communication line 12 is reached, the external diagnostic tool 20 sends a data frame which requests transmission of the diagnosis data of the storage request node 10a, to the multiplex communication line 12 so that the diagnosis data of the storage request node 10a can be read out. This data frame contains at least the identification information of the storage request node 10a which has detected the diagnosis data.

(7) Data Transmission

The data frame sent to the multiplex communication line 12 from the external diagnostic tool 20 is received by all the nodes 10 on the multiplex communication line 12. Each of the nodes 10 respectively determines, upon reception of the data frame from the external diagnostic tool 20, whether the diagnosis data which is detected by the storage request node 10a is finally stored in the memory 14 of the self node 10, based on the identification information of the storage request node 10a contained in the data frame.

When the final storage of the diagnosis data is performed, it is determined that the self node 10 is a winning node which has performed the final storage of the diagnosis data, and the diagnosis data which is actually stored in the memory 14 of the self node 10 is transmitted to the external diagnostic tool 20 via the multiplex communication line 12.

The external diagnostic tool 20 stores the diagnosis data into the memory when the diagnosis data of the storage request node 10a sent from the candidate storage execution node 10c which is the winning node is received by a predetermined operation. And the external diagnostic tool 20 performs the fault diagnosis of the vehicle based on the stored data so that a faulty part of the vehicle is specified.

Workers of a vehicle repair factory or the vehicle owner can grasp the faulty part of the vehicle through the external diagnostic tool 20 which performs the fault diagnosis.

Similar to the previously described embodiment, when a fault arises in a certain node 10, instead of the memory 14 provided in that node 10, the diagnosis data related to the fault can be stored into the memory 14 provided in another node 10 in the system of this embodiment. Namely, a request for storage of the diagnosis data related to the fault can be transferred from the node 10 to another node 10 through the multiplex communication line 12.

For this reason, if a fault arises in the node 10 which has the memory 14 with a comparatively small storage capacity and the memory 14 of that node 10 does not have a sufficient storage capacity to store all the diagnostic data related to the fault, the diagnosis data can be safely stored in the memory 14 of another node 10. And, at the time of subsequent fault diagnosis, the stored diagnosis data can be read from the memory 14 of another node 10 certainly.

Therefore, according to the system of this embodiment, it is possible to safely and reliably acquire the stored diagnosis data even when the fault diagnosis is created by the fault detection performed by a node 10 having the memory 14 with a small storage capacity, without increasing the memory space of the node 10.

In the system of this embodiment, a single storage execution node 10b which should request the storage of diagnosis data created by detection of a fault of the self node is not predetermined for every storage request node 10a. After the storage request node 10a requests temporary storage of the diagnosis data of the self node to all the nodes 10 on the multiplex communication line 12, the arbitration is carried out between the candidate storage execution nodes 10c to which the storage of the diagnosis data is requested from the storage request node 10a, and one of the candidate storage execution nodes 10c that finally stores the diagnosis data into the memory 14 of that node is selected.

According to the system of this embodiment, it is unnecessary for the storage request node 10a to store beforehand the identification information of the node 10 which is the requested storage execution node for storing the diagnosis data. When adding new node 10 on the multiplex communication line 12 or deleting the node 10 on the multiplex communication line 12, or when there is a node 10 which is installed or not installed depending on the type of the vehicle, it is not necessary to change the correspondence relation between the storage request node 10a and the storage execution node 10b separately as in the previous embodiment. It is possible for the system of this embodiment to construct the system with good expandability.

In the system of this embodiment, the arbitration is carried out between the candidate storage execution nodes 10c which has carried out the temporary storage of the diagnosis data of the storage request node 10a in the memory 14, and the node 10c that has completed the temporary storage of the diagnosis data and has outputted the storage declaration frame to the multiplex communication line 12 for the first time among the candidate storage execution nodes 10c is chosen as a winning node which finally stores the diagnosis data.

In order to complete the temporary storage of the diagnosis data into the memory 14, it is necessary to provide a sufficient storage capacity for the memory 14. For this reason, the node 10 having the memory 14 with a small storage capacity is not chosen as a winning node, and the node 10 which has completed the temporary storage may be chosen as a winning node which performs the final storage.

In the system in which the correspondence relation between the storage request node 10a and the storage execution node 10b is specified as in the previous embodiment, the problem may arise in that if the memory of the storage execution node 10b has a too small storage capacity the diagnosis data of the storage request node 10a is not fully stored in the memory 14 of the storage execution node 10b.

On the other hand, according to the system of this embodiment, one of the candidate storage execution nodes 10c which have the memory 14 with a sufficient storage capacity to store all the diagnosis data is chosen as a winning node. It is possible for the system of this embodiment to obviate the above-mentioned problem, and the diagnosis data of the storage request node 10a can be reliably acquired with a good probability at the time of the fault diagnosis.

Moreover, in the system of this embodiment, the candidate storage execution node 10c which has outputted the storage declaration frame to the multiplex communication line 12 for the first time is chosen as a winning node that finally stores the diagnosis data. Even if only one candidate storage execution node 10c exists on the multiplex communication line 12 other than the storage request node 10a, the candidate storage execution node 10c can be selected as a winning node. Therefore, according to the system of this embodiment, if the number of the candidate storage execution nodes 10c which are connected to the multiplex communication line 12 is more than one, the final storage of the diagnosis data of the storage request node 10a can be carried out regardless of the number of the nodes 10c. Consequently, it is possible to carry out the final storage of the diagnosis data of the storage request node 10a with good flexibility of the system configuration and scale.

In the system of this embodiment, the external diagnostic tool 20 is not provided with the map which defines the correspondence relation of the storage request node 10a and the storage execution node 10b as in the previous embodiment. Namely, a read request of the diagnosis data of the storage request node 10a is transmitted by the external diagnostic tool 20 to, not the specific node 10, but all the nodes 10 on the multiplex communication line 12, and the candidate storage execution node 10c which has completed the final storage of the diagnosis data transmits the diagnosis data to the external diagnostic tool 20 via the multiplex communication line 12.

According to the system of this embodiment, it is unnecessary for the external diagnostic tool 20 to store beforehand the map which defines the relation between the storage request node 10a and the storage execution node 10b. Therefore, when adding new node 10 on the multiplex communication line 12 or deleting the node 10 on the multiplex communication line 12, or when there is a node 10 which is installed or not installed depending on the type of the vehicle, it is not necessary to change the correspondence relation between the storage request node 10a and the storage execution node 10b separately as in the previous embodiment. It is possible for the system of this embodiment to construct the system with good expandability.

In addition, the system in which the external diagnostic tool 20 does not have the map which defines the correspondence relation between the storage request node 10a and the storage execution node 10b may be applied to the system of the previously described embodiment. Also in such a case, it is possible to secure the expandability of the system to the change in the nodes 10 on the multiplex communication line 12 to some extent.

In the above-mentioned embodiments, the external diagnostic tool 20 corresponds to the external diagnostic device in the claims, and the memory 14 provided in the node 10 corresponds to the storage unit in the claims, respectively.

In the above-mentioned embodiments, all the diagnosis data which are detected by the storage request node 10a are stored into the memory 14 of the other node 10. Alternatively, the fault diagnosis data recording system may be configured so that, when the available storage capacity of the memory of each node 10 is insufficient, the diagnosis data are divided into pieces of the diagnosis data and stored into the memories 14 of the plurality of other nodes 10.

Alternatively, the fault diagnosis data recording system may be configured so that, only when the available storage capacity of the memory of the storage request node 10a is insufficient, the remaining diagnosis data that cannot stored in the memory of the storage request node 10a are stored in the memories 14 of the other nodes 10.

In the above-mentioned embodiments, the plurality of electronic control units provided in the automotive vehicle are interconnected by the multiplex communication line 12. However, the present invention is not limited to these embodiments. Alternatively, the fault diagnosis data recording system of the invention may be applied to not only the automotive vehicle but also a plurality of nodes interconnected by the multiplex communication line 12 in other systems different from the automotive vehicle.

The present invention is not limited to the above-described embodiment, and variations and modifications may be made without departing from the scope of the present invention.

Further, the present application is based upon and claims the benefit of priority from Japanese patent application No. 2005-011573, filed on Jan. 19, 2005, the entire contents of which are incorporated herein by reference.

The invention claimed is:

1. A fault diagnosis data recording system for use in an automotive vehicle, which includes a plurality of nodes of the vehicle interconnected by a multiplex communication line, the fault diagnosis data recording system comprising:
    a first node of the vehicle configured to perform a fault detection of the first node; and
    a plurality of second nodes of the vehicle connected to the first node via the multiplex communication line, each of the plurality of second nodes configured to perform a fault detection of the second node and including a storage unit to store at least a part of result data of the fault detection performed by the first node,
    wherein the first node comprises a data transmitting unit configured to transmit result data of the fault detection performed by the first node to the plurality of second nodes via the multiplex communication line, and
    wherein each of the plurality of second nodes comprises a storage declaration frame transmitting unit configured to transmit, after a temporary storage of the result data, received via the multiplex communication line, in the storage unit of the second node is performed, a storage declaration frame, indicating that the second node has completed the temporary storage of the result data, to other nodes of the plurality of second nodes via the multiplex communication line.

2. The fault diagnosis data recording system according to claim 1, wherein identification information of the first node is associated with the result data of the fault detection performed by the first node, and the identification information is further stored in the storage units of the second nodes.

3. The fault diagnosis data recording system according to claim 1, wherein each of the plurality of nodes of the vehicle is configured to receive a request from an external diagnostic device connected to the multiplex communication line, and to transmit to the external diagnostic device the result data stored in a storage unit of that node via the multiplex communication line, in response to the received request.

4. A fault diagnosis data recording system for use in an automotive vehicle, comprising:
    a plurality of nodes of the vehicle interconnected by a multiplex communication line in the vehicle, each of the plurality of nodes being configured to perform a fault detection of the respective node and including a storage unit to store at least a part of result data of the fault detection performed by another node among the plurality of nodes;
    a first node among the plurality of nodes of the vehicle comprising a data transmitting unit configured to transmit result data of the fault detection performed by the first node to other nodes of the plurality of nodes via the multiplex communication line; and
    a plurality of second nodes among the plurality of nodes of the vehicle, each of the plurality of second nodes comprising a storage declaration frame transmitting unit configured to transmit, after a temporary storage of the result data, received via the multiplex communication line, in the storage unit of the second node is performed, a storage declaration frame, indicating that the second node has completed the temporary storage of the result data, to other nodes of the plurality of second nodes via the multiplex communication line.

5. The fault diagnosis data recording system according to claim 4, wherein identification information of the first node is associated with the result data of the fault detection performed by the first node, and the identification information is further stored in the storage units of the second nodes.

6. The fault diagnosis data recording system according to claim 4, wherein the second nodes among the plurality of nodes of the vehicle other than the first node are set up beforehand in correspondence with the first node.

7. The fault diagnosis data recording system according to claim 4, wherein the first node is configured to transmit the result data of the fault detection to the second nodes among the plurality of nodes of the vehicle via the multiplex communication line, and the second nodes of the vehicle other than the first node are configured to receive the result data of the fault detection via the multiplex communication line and store the received result data into the storage units of the second nodes.

8. The fault diagnosis data recording system according to claim 4,
wherein the first node is configured to transmit the result data of the fault detection to two or more other nodes of the plurality of nodes of the vehicle via the multiplex communication line, and
wherein each of said other nodes of the plurality of nodes of the vehicle is configured to receive the result data of the fault detection via the multiplex communication line and temporarily store the received result data into the storage unit of that node of the vehicle, respectively, and
wherein each of said other nodes of the plurality of nodes of the vehicle is configured to perform, after the temporary storage, arbitration of the temporarily stored result data according to a predetermined rule, so that one of said other nodes which is chosen by the arbitration finally stores the temporarily stored result data in the storage unit of that node of the vehicle.

9. The fault diagnosis data recording system according to claim 8, wherein the remaining nodes of said other nodes which are not chosen by the arbitration are configured to erase the result data temporarily stored in the storage units of the remaining nodes respectively.

10. The fault diagnosis data recording system according to claim 4, wherein each of the plurality of nodes of the vehicle is configured to receive a request from an external diagnostic device connected to the multiplex communication line, and to transmit to the external diagnostic device the result data stored in a storage unit of that node via the multiplex communication line, in response to the received request.

11. A fault diagnosis data recording method for use in an automotive vehicle, which records diagnosis data in a plurality of nodes of the vehicle interconnected by a multiplex communication line, the method comprising the steps of:
providing a first node among the plurality of nodes of the vehicle;
providing a plurality of second nodes among the plurality of nodes of the vehicle connected to the first node via the multiplex communication line, each of the plurality of second nodes configured to perform a fault detection of the second node and including a storage unit;
performing, by the first node, a fault detection of the first node;
transmitting, by a data transmitting unit of the first node, result data of the fault detection performed by the first node to the plurality of second nodes via the multiplex communication line;
storing, by each of the second nodes, at least a part of the result data of the fault detection performed by the first node in the corresponding storage unit,
transmitting, by a storage declaration frame transmitting unit of each of the plurality of second nodes, after a temporary storage of the result data, received via the multiplex communication line, in the storage unit of the second node is performed, a storage declaration frame, indicating that the second node has completed the temporary storage of the result data, to other nodes of the plurality of second nodes via the multiplex communication line.

12. A fault diagnosis data recording method for use in an automotive vehicle, comprising the steps of:
providing a plurality of nodes of the vehicle interconnected by a multiplex communication line in the vehicle, each of the plurality of nodes being configured to perform a fault detection of the respective node and including a storage unit to store at least a part of result data of the fault detection performed by another node among the plurality of nodes;
transmitting, by a data transmitting unit of a first node among the plurality of nodes of the vehicle, result data of the fault detection performed by the first node to other nodes of the plurality of nodes via the multiplex communication line; and
transmitting, by a storage declaration frame transmitting unit of each of a plurality of second nodes among the plurality of nodes of the vehicle, after a temporary storage of the result data, received via the multiplex communication line, in the storage unit of the second node is performed, a storage declaration frame, indicating that the second node has completed the temporary storage of the result data, to other nodes of the plurality of second nodes via the multiplex communication line.

* * * * *

UNITED STATES PATENT AND TRADEMARK OFFICE
CERTIFICATE OF CORRECTION

PATENT NO. : 7,711,461 B2
APPLICATION NO. : 11/793334
DATED : May 4, 2010
INVENTOR(S) : Nobuhiro Yokogawa It is certified that error appears in the above-identified patent and that said Letters Patent is hereby corrected as shown below:

Please amend the title page as follows:

Item (86), please change "PCT/JP2006/000683" to "PCT/JP2006/300683."

Signed and Sealed this

Thirteenth Day of July, 2010

David J. Kappos
*Director of the United States Patent and Trademark Office*